(12) United States Patent
Phung

(10) Patent No.: US 12,400,380 B2
(45) Date of Patent: Aug. 26, 2025

(54) METHOD AND SYSTEM FOR EFFECT CONTOURING IN AN AUGMENTED REALITY EXPERIENCE

(71) Applicant: L'OREAL, Paris (CA)

(72) Inventor: Edmund Phung, Toronto (CA)

(73) Assignee: L'OREAL, Paris (FR)

( * ) Notice: Subject to any disclaimer, the term of this patent is extended or adjusted under 35 U.S.C. 154(b) by 105 days.

(21) Appl. No.: 18/086,732

(22) Filed: Dec. 22, 2022

(65) Prior Publication Data
US 2024/0221251 A1    Jul. 4, 2024

(51) Int. Cl.
*G06T 11/60* (2006.01)
*G06Q 30/0601* (2023.01)
*G06V 10/20* (2022.01)

(52) U.S. Cl.
CPC .......... *G06T 11/60* (2013.01); *G06Q 30/0631* (2013.01); *G06Q 30/0643* (2013.01); *G06V 10/255* (2022.01)

(58) Field of Classification Search
CPC . G06T 11/60; G06T 7/11; G06T 7/246; G06T 2207/20084; G06T 7/70; G06T 2207/10016; G06T 17/00; G06T 2207/20081; G06Q 30/0643; G06Q 30/0631; G06Q 20/20; G06Q 30/0641; G06V 10/255; G06V 10/82; G06V 40/107; G06V 10/764; G06V 40/172; G06N 3/045;
(Continued)

(56) References Cited

U.S. PATENT DOCUMENTS

| 9,030,425 B2 | 5/2015 | Stafford | |
|---|---|---|---|
| 2013/0215148 A1* | 8/2013 | Antonyuk | G06F 3/017 345/633 |
| 2017/0154214 A1* | 6/2017 | Freeman | G06T 7/75 |

(Continued)

FOREIGN PATENT DOCUMENTS

CN    115169533 A    10/2022

OTHER PUBLICATIONS

French Preliminary Report on Patentability and Written Opinion issued Apr. 3, 2023, in 2303263 (with English Translation), 16 pages.
(Continued)

*Primary Examiner* — Xilin Guo
(74) *Attorney, Agent, or Firm* — Oblon, McClelland, Maier & Neustadt, L.L.P.

(57) ABSTRACT

Methods, apparatus and techniques shape localized objects using a shape model for rendering a reshaped object with an effect such as for a virtual try on (VTO) experience. A VTO can simulate finger/toe nail effects of a nail product or service to nail objects. An example system comprises a nail localization engine including computational circuitry to localize one or more nail objects in an input image of a hand or foot via one or more deep neural networks; a nail shaping engine including computational circuitry for reshaping, via a trained shape model, the one or more nail object as localized by the nail localization engine; and a rendering component including computational circuitry to render an output image simulating a nail product or nail service applied to the one or more nail objects in accordance with the reshaping by the nail shaping engine to provide a virtual try on experience.

5 Claims, 9 Drawing Sheets

1600

Localizing one or more nail objects in an input image of a hand or foot via one or more deep neural networks, wherein the one or more deep neural networks is configured for antialiasing in each of the encoder and decoder components
1602

Rendering an output image simulating a nail product or nail service applied to the one or more nail objects, responsive to the localizing by the nail localization engine, to provide a virtual try on (VTO) experience
1604

(58) Field of Classification Search
CPC ........... G06N 3/08; G06F 18/24; G06F 40/30;
A45D 29/11; A45D 2029/005
See application file for complete search history.

(56) References Cited

U.S. PATENT DOCUMENTS

2017/0287137 A1* 10/2017 Lin .................... G06V 10/454
2018/0165855 A1*  6/2018 Cheng ................... G06T 7/136
2020/0349711 A1* 11/2020 Duke .................. G06F 18/2431
2021/0150728 A1*  5/2021 Ahmed .................... G06T 7/11

OTHER PUBLICATIONS

International Search Report and Written Opinion issued Feb. 15, 2024, in PCT/EP2023/086474, 21 pages.
Hui Wang et al., "Improving image segmentation via shape PCA reconstruction", Acoustics Speech and Signal Processing (ICASSP), 2010 IEEE International Conference on, Mar. 14, 2010, pp. 1058-1061, XP031697288,.
Richard Zhang: "Making Convolutional Networks Shift-Invariant Again", arxiv.org, Cornell University Library, 201 Olin Library Cornell University Ithaca, NY 14853, Apr. 25, 2019 (Apr. 25, 2019), XP081370676,.
Lin Liang et al., "An Integrated Model for Accurate Shape Alignment", May 7, 2006, SAT 2015 18th International Conference, Sep. 24-27, 2015; [Lecture Notes in Computer Science; Lect.Notes Computer], Springer, Berlin, Heidelberg, pp. 333-346, XP047430103,.

* cited by examiner

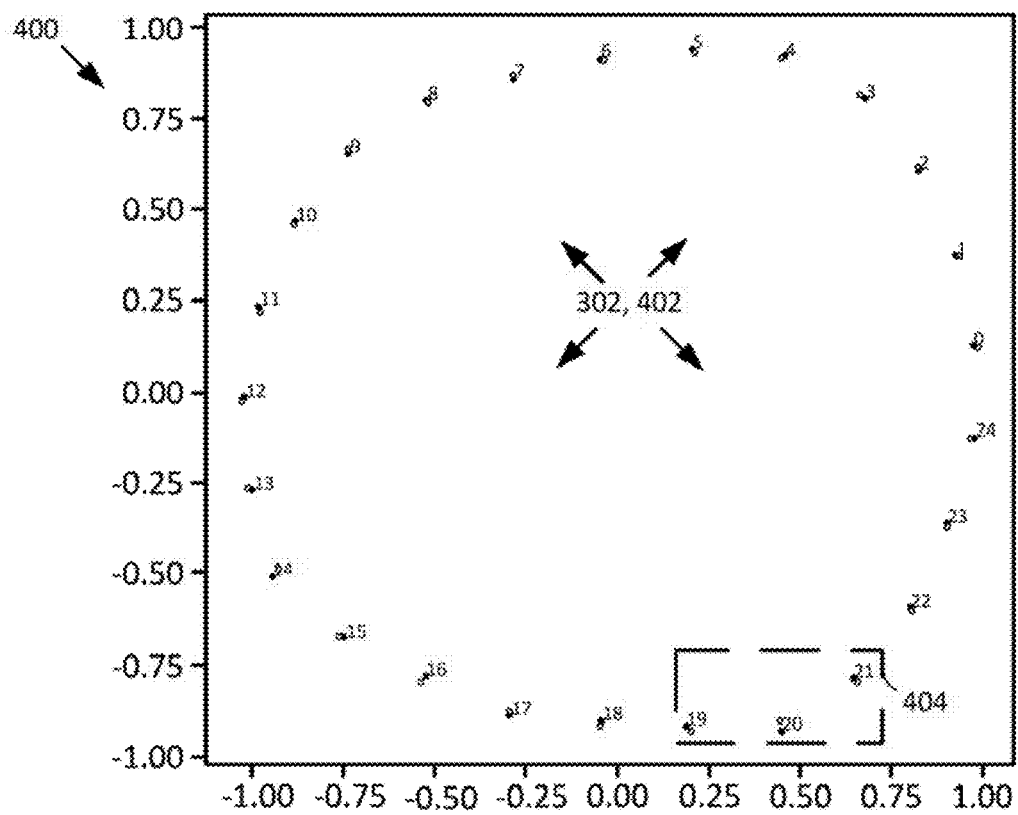
Fig. 4A
Fig. 4B
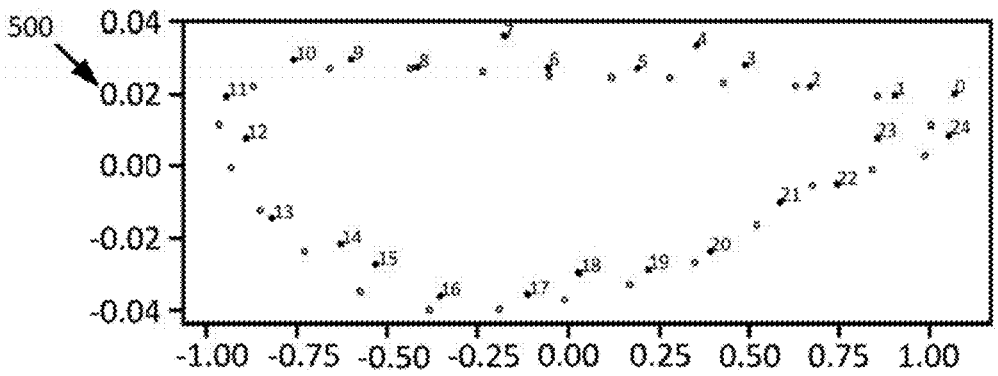
Fig. 5

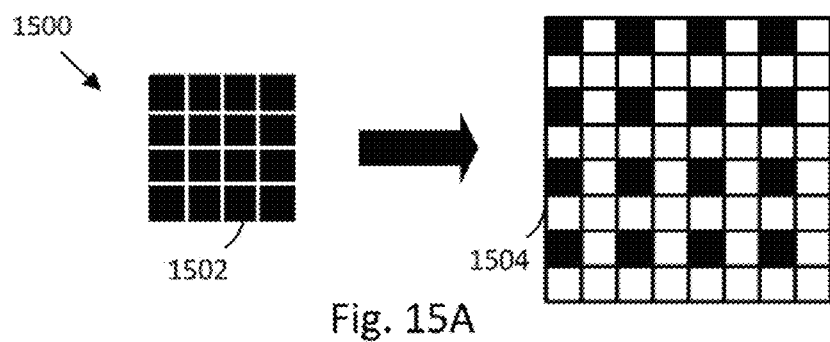
Fig. 15A
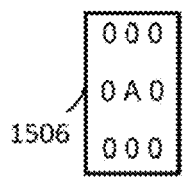   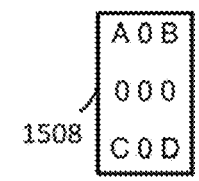   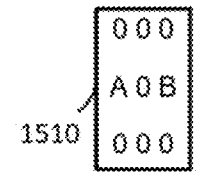   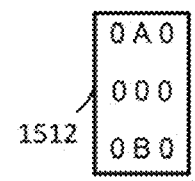
Fig. 15B    Fig. 15C    Fig. 15D    Fig. 15E
   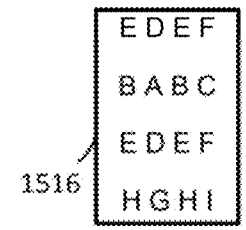
Fig. 15F    Fig. 15G
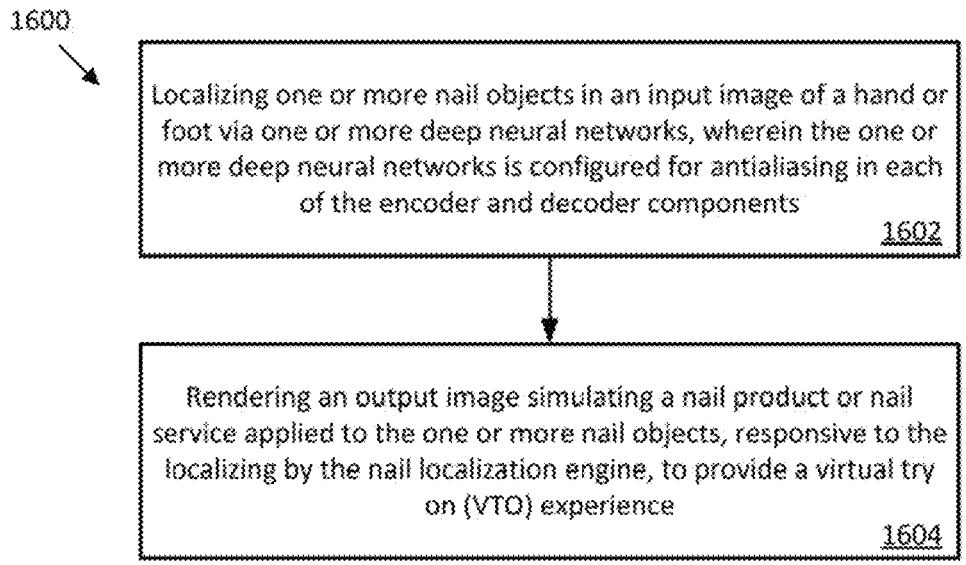
Fig. 16

US 12,400,380 B2

METHOD AND SYSTEM FOR EFFECT CONTOURING IN AN AUGMENTED REALITY EXPERIENCE

FIELD OF INVENTION

This application relates to image processing such as to localize an object in one or more images render an effect associated with the object, and more particularly to effect contouring in an augmented reality experience such as a virtual try on (VTO).

BACKGROUND

Deep learning techniques are useful to process images including a series of video frames to localize one or more objects in the images. In an example, the objects are portions of a user's body such as a face or a hand, particularly the finger nails. Image processing techniques are also useful to render effects in association with such objects such as to augment reality for the user. One example of such an augmented reality is providing a VTO that simulates the application of a product to the object. Product simulation in the beauty industry includes simulating makeup, hair, and nail effects. Other examples can include iris localization and the simulation of a color change thereto such as by a colored contact lens. These and other VTO effects will be apparent.

Improved techniques are desired to render an effect to provide realistic shapes or contours such as when providing augmented realities including VTO experiences.

SUMMARY

Methods, apparatus and techniques embodiments shape localized objects using a shape model for rendering a reshaped object with an effect such as for a virtual try on (VTO) experience. A VTO can simulate finger/toe nail effects of a nail product or service to nail objects. An example system comprises a nail localization engine including computational circuitry to localize one or more nail objects in an input image of a hand or foot via one or more deep neural networks; a nail shaping engine including computational circuitry for reshaping, via a trained shape model, the one or more nail object as localized by the nail localization engine; and a rendering component including computational circuitry to render an output image simulating a nail product or nail service applied to the one or more nail objects in accordance with the reshaping by the nail shaping engine to provide a virtual try on experience.

There is provided a computer-implemented method comprising executing on a processor one or more steps comprising: rendering an effect to an object having an original shape as detected in an input image, wherein the effect is applied to the input image in accordance with an updated shape obtained from a trained shape model that constrains the original shape in response to important shape features identified by the trained shape model.

There is provided a system comprising: a nail localization engine including computational circuitry to localize one or more nail objects in an input image of a hand or foot via one or more deep neural networks; a nail shaping engine including computational circuitry for reshaping, via a trained shape model, the one or more nail objects as localized by the nail localization engine; and a rendering component including computational circuitry to render an output image simulating a nail product or nail service applied to the one or more nail objects in accordance with the reshaping by the nail shaping engine to provide a virtual try on (VTO) experience.

These and other aspects will be apparent to a person of ordinary skill in the art.

BRIEF DESCRIPTION OF DRAWINGS

FIG. 4A is a graph depicting two contours, namely an input shape comprising the points of the contour of FIG. 3 and an output shape determined from the output points of a principal component analysis (PCA) model after applying dimensionality reduction using PCA. FIG. 4B is an enlargement depicting a portion of FIG. 4A.

FIG. 5 is a graph depicting two contours comprising an input shape with added noise and an output shape comprising the output points of the PCA model after applying dimensionality reduction using PCA.

FIG. 15A is a graphic illustration of a BlurZoom operation in accordance with an embodiment; and FIGS. 15B, 15C, 15D, 15E, 15F and 15G are examples of tensor data in relation to BlurZoom operations in accordance with embodiments.

FIG. 16 is a flowchart of operations of a computing device in accordance with an embodiment.

DETAILED DESCRIPTION

Figure 1:
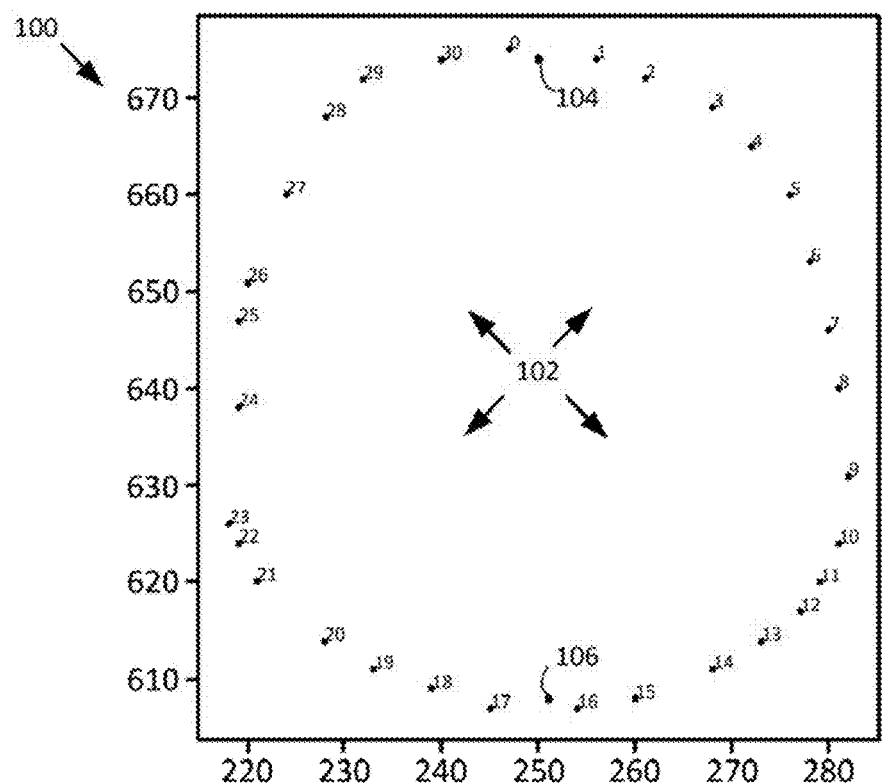
FIG. 1 is a graph depicting an extracted contour comprising a plurality of numbered points for an instance of an object represented in a class map.

In accordance with embodiments herein, there is described one or more techniques for object localization and object shaping. In embodiments described herein the class of object is a nail for nail colouring such as one or more fingernails of a hand or toenails of a foot. An image may comprise multiple instances of such objects. In a hand or foot example to localize nails, the number of objects is typically five. In embodiments herein, a deep neural network classifies and segments for the nail objects.

In an embodiment, such as for providing a VTO experience from a "live" stream of video (e.g. a selfie video), each frame (e.g. each image) of the video is processed to localize the objects, to generate a processed shape of the objects and to render the objects with one or more effects in accordance with the processed shape.

An example of a deep neural network for object localization is described in US2020/0349711A1 published Nov. 5, 2020, now U.S. Ser. No. 11/410,31482, and entitled "Image Processing Using a Convolutional Neural Network to Track a Plurality of Objects", the contents of which are incorporated herein by reference in their entirety. An example deep neural network for object localization as adapted from US2020/0349711A1 is further described herein below with reference to FIGS. 13 and 14.

In an embodiment, object localization comprises determining the location of an object or more than one object in an image. In an example, a deep neural network is trained as a semantic classifier to detect, for example, a particularly class of object. The deep neural network can perform semantic segmentation to process an image to provide a mask classifying each pixel to indicate whether a pixel is or is not an object pixel—that is whether a pixel is a member of the class of object or is a background pixel. In an embodiment, a mask is a one channel output from the network indicating a probability for each pixel of an input image, as processed by the network, of whether the pixel is a nail. Probability values are typically between 0 and 1. A threshold can be applied to a pixel's probability value to determine which pixel is a nail pixel and which pixel is background pixel, for example, to produce a thresholded mask of binary values. In an embodiment, each pixel is assigned a 1 or a 0 in response to the threshold applied to the probability in the mask from the network. A threshold can be 0.5. The resulting thresholded mask is thus a two dimensional shape representation of the three dimensional class object(s) in the image. Some deep neural networks can classify for multiple classes of objects.

In an embodiment, the deep neural network further produces a class map. In a nail embodiment that localizes five nails per hand, as an example, the class map is a five channel output, consisting of the probabilities for each finger class (pinky, ring, middle, index, and thumb). However, these probabilities are only valid within the nail regions defined by the nail mask. As a result, the class map actually does not contain information about whether the current pixel is a nail or not.

For some tasks, a class map is useful instead of a segmentation mask because the mask tends to be noisier while the class map has cleaner edges. An augmented class map for the objects can be constructed to contain the background class, using the thresholded mask. In an embodiment, to make the class map easier to work with and to define the augmented class map, the class map is processed by flattening the 5 channel class map into a 1 channel map where each pixel contains an integer representing the class, where the class is determined by the finger with the highest probability. The "background" class is also add in by using data from the mask. The augmented class map can be used, in an embodiment, to find contours of the (nail) objects, for example. It is noted that it is possible to use either the thresholded mask or the augmented class map for a contour extraction step.

Additionally, in an embodiment, the deep neural network further produces a direction map indicating a direction of each object such as from a first end to a second end of the object (e.g. a base to a tip or vice versa for a nail object).

Object localization is described further herein below, after a description of object shaping. Object shaping refines the shape of the object from object shape information presented in the class map.

Improving an Object Shape

Object shape information in class maps may be inaccurate and differences in detection between frames of a video can highlight shape differences, particularly inaccuracies. A goal of the task of object shaping is to improve the shape and stability of an object (e.g. when rendered in an output image).

From the class map, a contour of each object is determinable, where the contour comprises a margin or border about the object following the outer contour of the object's shape as represented in the class map. In an embodiment, an augmented class map is defined and used for contour extraction. In an embodiment, a shape model is used to refine the shape of each object, responsive to the contours. The refined shape is useful to update the mask.

In embodiments, rendering, the process of applying an effect to the object to construct an output image such as for a VTO experience, is responsive to the processed object contours instead of the contours from the original class map for each detected object. A revised mask is determinable in accordance with the refined shapes as determined by applying the contours to a shape model. During rendering, the mask is used since the probability values makes the rendered result look smoother. In an embodiment, when rendering, processing renders one nail at a time in the output image, so the class map is also useful determining which mask pixels belong to the current class.

In accordance with an embodiment, object shaping steps comprise:
1. Extracting the object contours from the class map;
2. For each contour:
3. Converting the contour into a "standardized" form;
4. Normalizing the contour to remove rotation, position, and scaling;
5. Projecting the contour into a shape model (e.g. a PCA model) with reduced dimensionality;
6. Stabilizing the contour in model space;
7. Unprojecting the contour from model space;
8. Re-apply rotation, translation, and scaling to the contour; and
9. Generating a new mask from the contours.

Each step 1-9 is further described.

Extracting contours: in an embodiment, the contours are extracted from the class map, for example as augmented in accordance with the description herein above. However, the thresholded mask can be used in an embodiment. Contour extraction can be performed such as by using known techniques. An open source example of a contour extraction function is "cv::findContours" available from OpenCV (Open source Computer Vision) at opencv.org. This function implements aspects of S. Suzuki, and K. Abe, "Topological structural analysis of digitized binary images by border following" Computer Vision, Graphics, and Image Processing 30 (1): 32-46 (1985). The function is able to automatically determine the number of contours and the location of each contour.

FIG. 1 shows a graph 100 representing an extracted contour 102 comprising a plurality of numbered points 0 to 30 for an instance of an object represented in a class map (not shown). FIG. 1 is a constructed example of what a detected contour may look like. The x and y axes represent the (x, y) position in the coordinate system of the image Graph 100 includes point 104 which represents the base and a point 106 which represents the tip of the object (a nail). These points are for illustration purposes and are not part of the output from the contour extraction function, for example.

Figure 2:
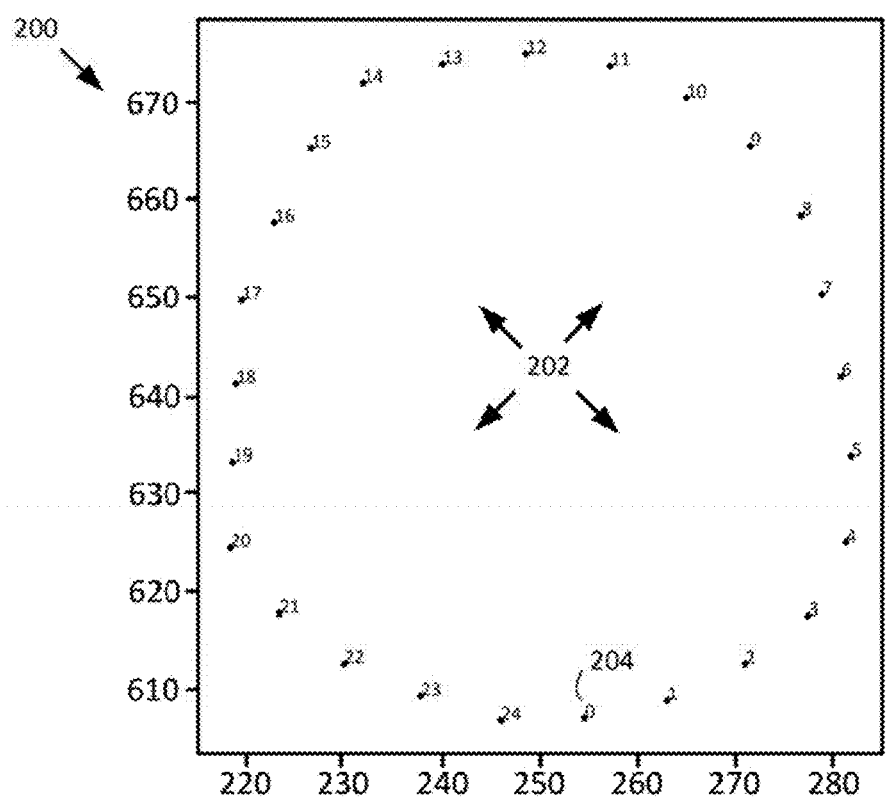
FIG. 2 is a graph depicting a standardized contour converted from the contour of FIG. 1.

Convert contour to standardized form: FIG. 2 is a graph 200 representing a standardized contour 202 converted from contour 102. The contours extracted using an extraction function (e.g. contour 102) typically have a different number of points for different object instances. Also the location of the points is typically different. To simplify working with extracted contour points, the extracted points are converted to a curve using a curve fitting method and re-sampled (e.g. at pre-defined relatively evenly distributed locations) so that the same number (e.g. 25) of points per nail (object) are defined for use (e.g. points 0 to 24) and each respective point is located at roughly the same area of the nail (for example, point 0 (204) is always at the tip of the nail object). In an embodiment, curve fitting using cardinal splines is employed (see en.wikipedia.org/wiki/Cubic_Hermite_spline#Cardinal_spline).

Figure 3:
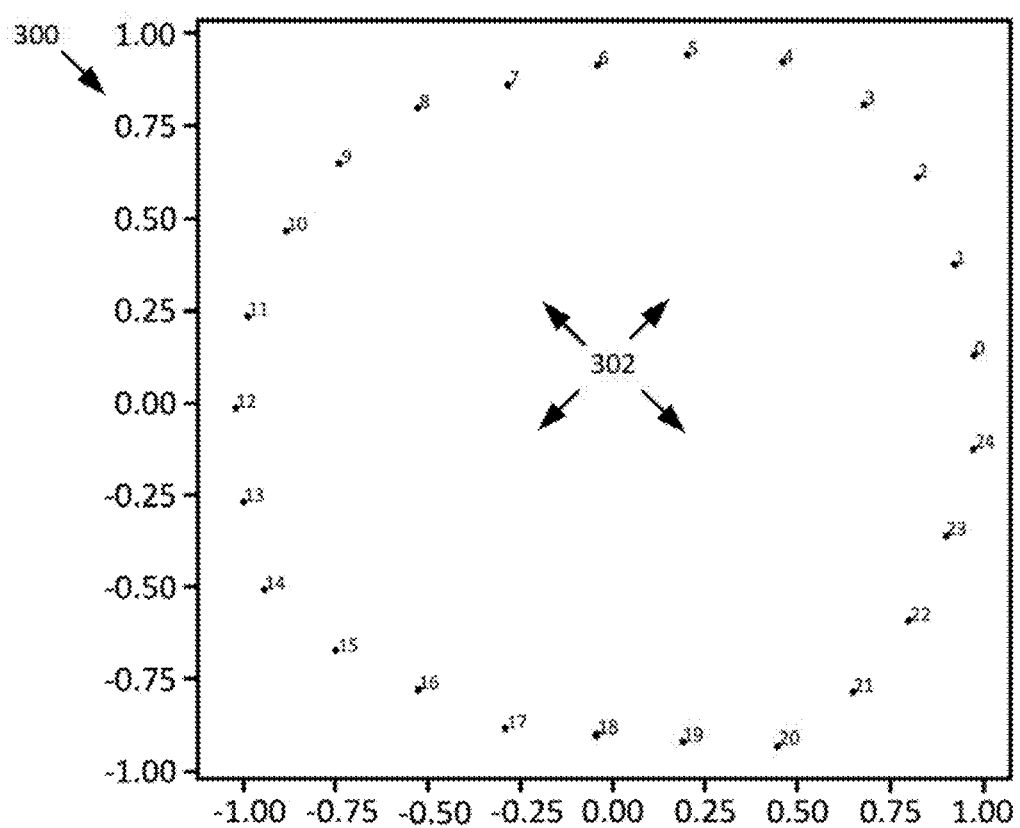
FIG. 3 shows a graph depicting a normalized contour constructed from the standardized contour of FIG. 2.

Normalize the contour: The standardized contour information includes data dimensions that can complicate further analysis and that do not relate only to shape per se. To facilitate further analysis of the object shape, such as by using principal component analysis (PCA) techniques, it is desired that the shape modelling only models the shape and nothing else. Normalization operations remove rotation, position, and scaling from the standardized contours. FIG. 3 shows a graph 300 depicting a normalized contour 302 constructed from standardized contour 202. In an embodiment, a normalization process comprises: 1) averaging all the contour points to get an estimate of the object center (alternatively, the centroid could be computed); 2) subtracting the center point from all the points to normalize for position; 3) rotating all the points by the negative nail angle to normalize for rotation, e.g. where the nail angle is obtained from the direction map output by the nail detection model; and 4) calculate the minimum/maximum X values and scale the points uniformly so that the X values are within −1 to 1 to normalize for scale. In an embodiment, uniform scaling is used in order to keep the aspect ratio.

Project the contour into the model space: In an embodiment, the object shape is constrained using PCA techniques, including a PCA model. The PCA model is trained with applicable object shape data. The PCA model has input data requirements. It is noted that other approaches could be used for a shape model. For example, a different method of dimensionality reduction could be used such as training an auto-encoder using a neural network.

In general, PCA is used to learn a different representation of the contour data, where the newly learned space contains dimensions that are ordered by how much variance they account for in the data. For a PCA model that models, for example, nail shapes, the input representation in an embodiment comprises a set of 2D points and the output representation comprises a set of numbers that more abstractly represents the shape. For example, the first number might affect the overall high level shape, while subsequent numbers might progressively affect the increasingly fine details of the shape.

Dimensionality reduction (on the PCA model) can be performed to constrain a nail shape by removing the dimensions that model the little details, which can result in a smoother and more natural looking nail shape. The resultant PCA model data is then unprojected back into the input space (e.g. contours) to get a new set of 2D points.

For this task, in an embodiment the PCA model serves three purposes. The PCA model contains knowledge of what a valid nail shape looks like and can be used to constrain the detected nail contour to fix any atypical or noisy contours. Stabilization can be performed in PCA space which allows the shape to be stabilized across time (e.g. between frames of a video). The model can also measure how much error there is between the current shape and the closest nail shape from the model. If the error is high, it could indicate a false detection or a very inaccurate contour and it can discard that particular nail from the rendering. It may be better to not render a nail than to render a really inaccurately shaped nail. An example where shape is inaccurate includes an occlusion by a non-nail object or where two nail objects overlap and cannot be distinguished. Additionally, inaccuracy can be caused by a number of other factors such as: poor lighting, motion blur, unclear boundary between the nail and background, and anything else that would make it difficult to correctly segment the nail.

To train the PCA model, the contours from the nails training data are pre-processed using the same standardization and normalization steps such as described above. For each nail object, the input to the PCA model is 25 points (50 dimensions in total when flattened, due to the point x and y values). About 6,500 nail shapes were used for training the model.

Dimensionality reduction is performed when projecting to PCA space. PCA provides a way to map from the input space to the PCA space. The transformation comprises multiplying the input data by a projection matrix. This matrix is obtained during training. For more details, see en.wikipedia.org/wiki/Principal_component_analysis#Dimensionality_reduction. There is a trade-off between how well the model can constrain the shape versus how expressive the model is. If the number of dimensions is small, the model will constrain the nail shape very well, but may have difficulty modeling all the possible nail shapes and nail poses. If a high number of dimensions is used, it can better model all the different nail shapes and poses, but will be worse at constraining the shape. From experimentation, it was found that reducing it from 50 to 15 dimensions provided an acceptable balance in the above trade-off. This reduction can be performed post-training of the shape model and comprises "trimming" the projection matrix based on the number of dimensions.

FIG. 4A is a graph 400 depicting two contours, namely an input shape comprising the points of contour 302 and an output shape (contour 402) determined from the output numbers of the PCA model after applying dimensionality reduction using PCA. In this example, since the input is already relatively smooth, the output is not much different than the input. FIG. 4B is an enlargement depicting a portion of FIG. 4A at area 404 showing the numbered points of contour 302 and contour 402. The points of contour 302 are depicted as a hollow circle and are immediately adjacent a lower left corner of the number for the point.

FIG. 5 is a graph 500 depicting two contours, namely an input shape comprising the points of a contour 502 and an output shape (points of contour 504) determined from the output numbers of the PCA model after applying dimensionality reduction using PCA. The input contour 502 of FIG. 5 shows a different example where noise is intentionally added to the input curve to simulate a noisy detection. Using PCA dimensionality reduction removes almost all the noise.

Stabilize in PCA space: Optionally, in an embodiment, shape data is stabilized across time. In a "live" mode (e.g. in a component of a VTO experience where frames of a video are rendered with effects applied to one or more objects in the frames), the PCA data (e.g. in PCA space) is stabilized in order to stabilize the shape across time (e.g. frame to frame). In an embodiment, an exponential moving average is applied to the PCA data, where the weight is determined by the velocity of the nails in order to minimize perceived lag. In an embodiment, velocity is determined by calculating the change in the center position of the contour from one frame to the next. A history of N current plus past velocities is kept and averaged to produce a final velocity per nail. In an embodiment, N=2. When the nails are moving, little stabilization is done and when the nails are still, a high amount of stabilization is used. In the embodiment, the same weight is applied to all the components. In another embodiment, the components are weighted differently. For example, the more major components (which model the overall shape) can be stabilized less than the less major components (which model the small details of the shape). Stabilization is not applicable to processing and rendering a single image as a time domain is not present in the data.

It is preferred to stabilize in the PCA data space, thought it would be possible to stabilize after unprojecting from PCA space, e.g. after re-applying the transformations. An advantage of stabilizing within the PCA space is that it focuses on stabilizing only the core aspects of the shape, rather than affecting the rotation, position, etc. Stabilizing the position can produce a very noticeable lag, which is not a preferred result.

Unproject from PCA space: In this step, the PCA data is unprojected back into the original space (contour space) to get the new contour.

Re-apply rotation, translation, and scaling: Rotation, translation, and scaling is re-applied to the new contour.

Generate new mask: A new nail mask image (e.g. a rendering image) is generated by drawing the new contours for each nail into a blank image. A new class map is also generated since the nail shapes have now changed.

Rendering can be performed in accordance with the new mask, for example, to render an effect within the region of the object defined by the updated contour, namely to the pixels within as identified by the new mask. In an example, the effect is a nail effect, for example, applying a nail color to simulate nail polish or a nail texture. Other nail effects can be applied in response to the shaped object. For example, nail shape can be applied, for example, to extend length to simulate French tips or an acrylic type or other material type of nail shape, etc.

Object Shaping Example Results

Figure 6A:
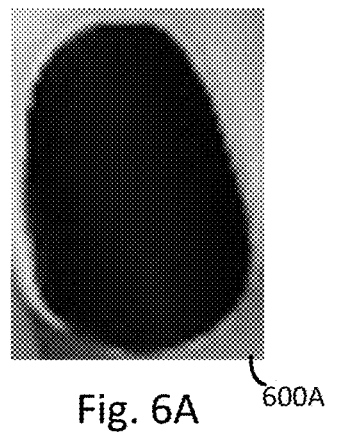
FIGS. 6A and 6B respectively show a rendered image without object shaping, and a rendered image with object shaping in accordance with an embodiment herein.
Figure 6B:
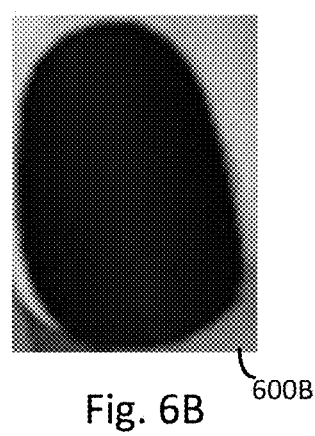
Figure 7A:
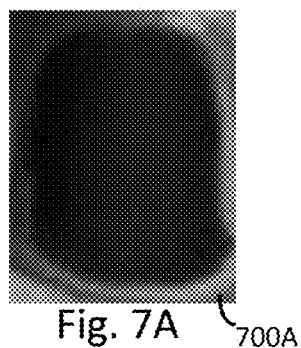
FIGS. 7A and 7B respectively show a rendered image without object shaping, and a rendered image with object shaping in accordance with an embodiment herein.
Figure 7B:
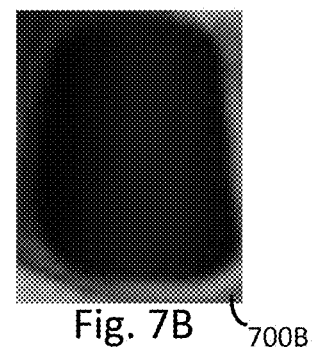
Figure 8A:
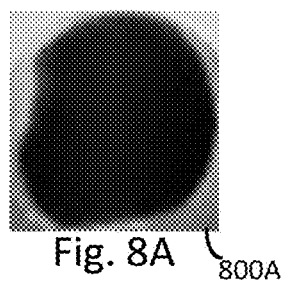
FIGS. 8A and 8B respectively show a rendered image without object shaping, and a rendered image with object shaping in accordance with an embodiment herein.
Figure 8B:
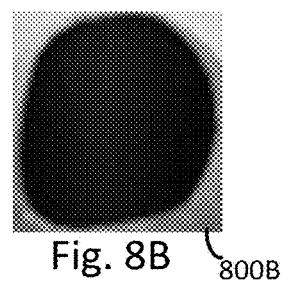
Figure 9A:
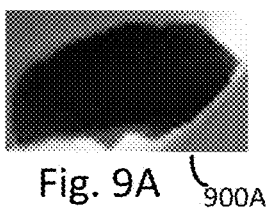
FIGS. 9A and 9B respectively show a rendered image without object shaping, and a rendered image with object shaping in accordance with an embodiment herein.
Figure 9B:
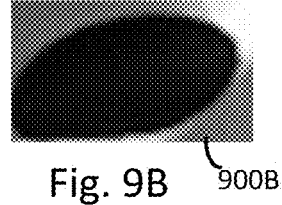

FIGS. 6A and 6B show, in relation to a first example input image (not shown), a rendered image without object shaping 600A, and a rendered image with object shaping 600B in accordance with an embodiment herein. FIGS. 7A and 7B show, in relation to a second example input image (not shown), a rendered image without object shaping 700A and a rendered image with object shaping 700B in accordance with an embodiment herein. FIGS. 8A and 8B show, in relation to a third example input image (not shown), a rendered image without object shaping 800A and a rendered image with object shaping 800B in accordance with an embodiment herein. FIGS. 9A and 9B show, in relation to a fourth example input image (not shown), a rendered image without object shaping 900A and a rendered image with object shaping 900B in accordance with an embodiment herein. FIGS. 6A-6B, 7A-7B, 8A-8B and 9A-9B are enlarged portions of hand images to more clearly show the differences provided by object shaping.

Figure 10:
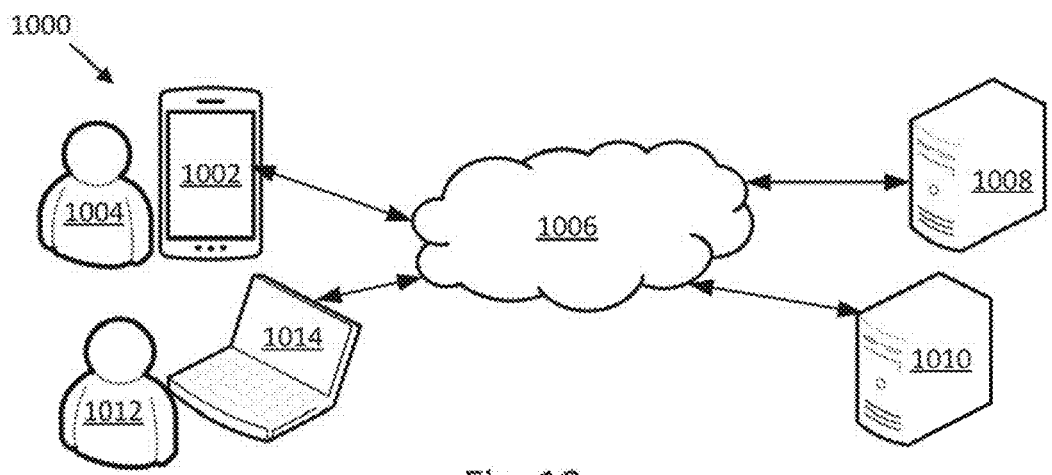
FIG. 10 is an illustration of a computer network providing an environment for various aspects according to embodiments herein.
Figure 11:
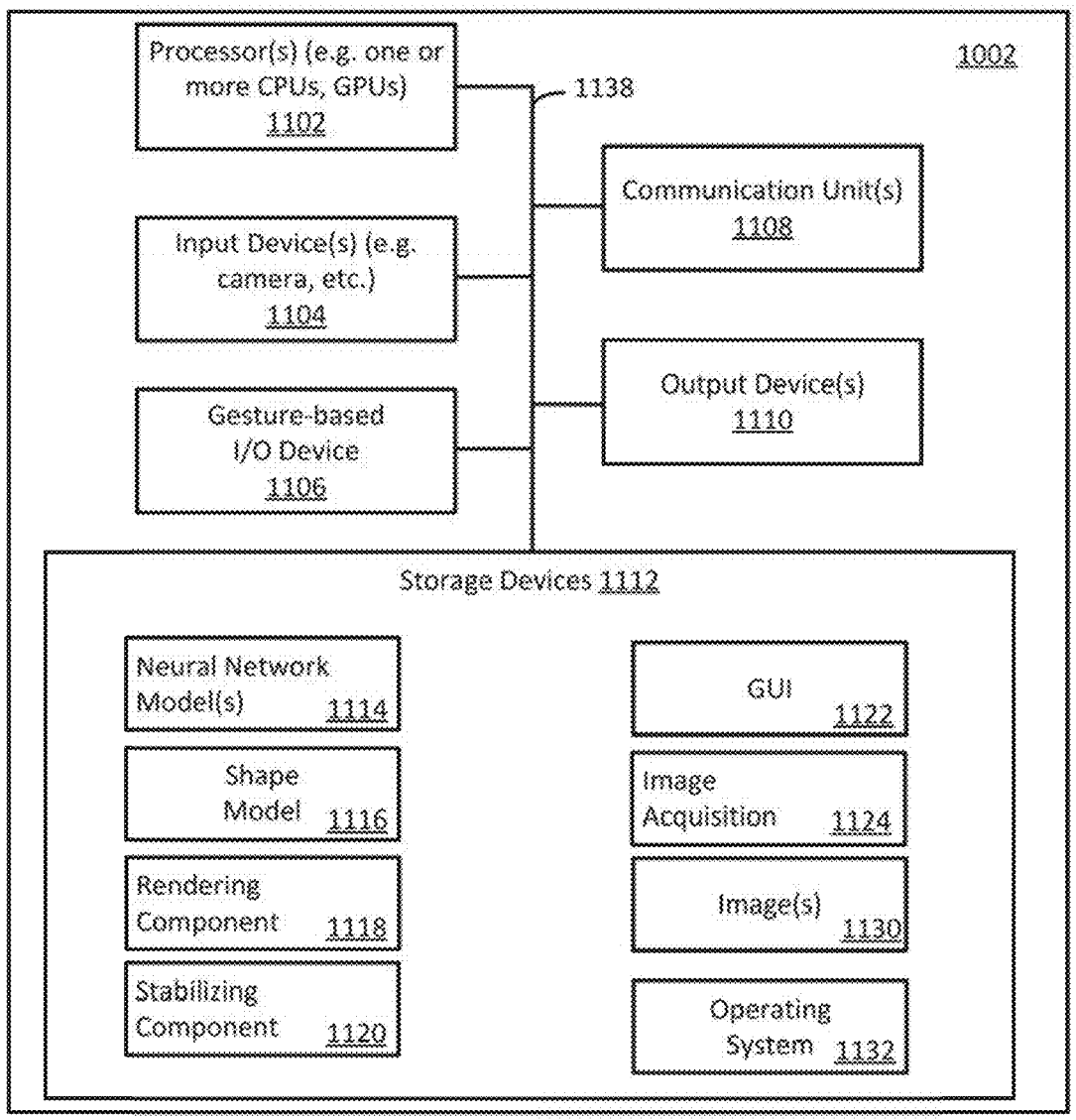
FIG. 11 is a block diagram of a computing device of the computer network of FIG. 10.

FIG. 10 is an illustration of a computer network providing an environment for various aspects according to embodiments herein. FIG. 11 is a block diagram of a computing device of the computer network of FIG. 10.

With reference to FIG. 10 an example computer network 1000 is shown in which a computing device 1002 for personal use is operated by a user 1004. Device 1002 is in communication via a communications network 1006 with remotely located server computing devices, namely server 1008 and server 1010. User 1004 may be a consumer of nail related products or services. Also shown is a second user 1012 and a second computing device 1014 configured for communication via communications network 1006 such as to communicate with server devices 1008 or 1010. Second user 1012 may also be a consumer of nail related products or services.

Briefly, each of computing devices 1002 and 1014 is configured to perform a virtual try on of nail products or services. In an embodiment, a neural network for localizing nail objects is stored and utilized on board computing device 1002 or 1014. In an alternative embodiment or it may be provided from server 1008 such as via a cloud service, web service, etc. from image(s) received from computing device 1002 or 1014. In an embodiment, the neural network is as described herein and outputs masks and class maps when processing images. Thus devices 1002, 1014 or 1008 can each comprise a nail object localization engine having computational circuitry configured to localize one or more nail objects in an input image of a hand or foot via one or more deep neural networks.

The one or more objects as localized can be reshaped using a trained shape model such as described herein. Thus devices 1002, 1014 or 1008 can each comprise a nail shaping engine including computational circuitry for reshaping, via a trained shape model, the one or more nail object as localized by the nail localization engine. In an embodiment, the trained shape model reduces data dimensionality to identify the important features. In an embodiment, the trained model is defined and trained in accordance with principal component analysis techniques.

The reshaped nail objects are useful to render effects to the input images such as to simulate a product or service providing a virtual try on (VTO) experience to a user. Thus devices 1002, 1014 or 1008 can each comprise a rendering component including computational circuitry to render an output image simulating a nail product or nail service applied to the one or more nail objects in accordance with the reshaping by the nail shaping engine to provide a VTO experience. In an embodiment, devices 1002 and 1014 comprise respective display devices for visualizing the VTO experience.

Device 1008 or 1010 can provide one or more cloud and/or web-based services such as one or both of a service to recommend nail related products or services (e.g. nail salon services) and a service to purchase nail related products or services via an e-commerce transaction. Thus, for example, each of devices 1002, 1014, 1008 or 1010 can include a nail VTO component including computational circuitry to one or both of recommend the nail product or nail service for virtual try on, and purchase the nail product or nail service via an e-commerce transaction. In an embodiment, the nail VTO component of devices 1002 and 1014 can communicate with one or both of servers 1008 and 1010 to obtain a recommendation or to conduct a purchase transaction. It is understood that payment service related devices to conduct an ecommerce transaction are not shown for simplicity, nor are storage components storing product or service information for such recommendations and/or purchases.

Devices 1002 and 1014, in an embodiment, comprise respective cameras such as for taking input images, which may comprise selfie images, including videos having a series of frames. The input images for processing can be frames of the video, including, for example, a current frame of a video. Each of 1002, 1014 or 1008 can comprise a stabilizing component including computational circuitry to stabilize the reshaping of the one or more nail objects between the series of frames of the video.

Computing device 1002 is shown as a handheld mobile device (e.g. a smartphone or tablet). However it may be another computing device such as a laptop, desktop, workstation, etc. Similarly device 1014 can take another form factor. Computing devices 1002 and 1014 may be configured using one or more native applications or browser-based applications, for example, to provide the VTO experience.

FIG. 11 is a block diagram of computing device 1002, in accordance with one or more embodiments of the present disclosure. Computing device 1002 comprises one or more processors 1102, one or more input devices 1104, a gesture-based I/O device 1106, one or more communication units 1108 and one or more output devices 1110. Computing device 1002 also includes one or more storage devices 1112 storing one or more modules and/or data. Modules may reference software modules, a component of such a device 1002 and may include deep neural network model 1114 such as for a nail localization engine, a (trained) shape model 1116 such as for a nail shaping engine, a module for a rendering component 1118, a module for a stabilizing component 1120, user interface modules such as components for a graphical user interface (GUI 11120) and a module for image acquisition 1124. Data may include one or more images for processing or as output from processing (e.g. images 1130), etc.

The modules such as when executed by the one or more processors 1102 provide the functionality to acquire one or more images such as a video and process the images to provide the VTO experience. In another example (not shown) any one or more of the neural network model, trained shape model, rendering component and stabilizing component is remotely located (e.g. in server 1008, 1010 or another computing device). Computing device 1002 may communicate input image(s) (e.g. from images 1130) for processing and return.

Storage device(s) 1112 may store additional modules such as an operating system 1132 and other modules (not shown) including communication modules; graphics processing modules (e.g. for a GPU of processors 1102); map module; contacts module; calendar module; photos/gallery module; photo (image/media) editor: media player and/or streaming module; social media applications; browser module; etc. Storage devices may be referenced as storage units herein.

The one or more processors 1102 may implement functionality and/or execute instructions within computing device 1002. For example, processors 1102 may be configured to receive instructions and/or data from storage devices 1112 to execute the functionality of the modules shown in FIG. 11, among others (e.g. operating system, applications, etc.) Computing device 1002 may store data/information to storage devices 1112. Some of the functionality is described further herein be-low. It is understood that operations may not fall exactly within the modules set out in the storage device 1112 of FIG. 11 such that one module may assist with the functionality of another.

Computer program code for carrying out operations may be written in any combination of one or more programming languages, e.g., an object oriented programming language such as Java, Smalltalk, C++ or the like, or a conventional procedural programming language, such as the "C" programming language or similar programming languages.

Computing device 1002 may generate output for display on a screen of gesture-based I/O device 1106 or in some examples, for display by a projector, monitor or other display device. It will be understood that gesture-based I/O device 1106 may be configured using a variety of technologies (e.g. in relation to input capabilities: resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology; and in relation to output capabilities: a liquid crystal display (LCD), light emitting diode (LED) display, organic light-emitting diode (OLED) display, dot matrix display, e-ink, or similar monochrome or color display).

In the examples described herein, gesture-based I/O device 1106 includes a touchscreen device capable of receiving as input tactile interaction or gestures from a user interacting with the touchscreen. Such gestures may include tap gestures, dragging or swiping gestures, flicking gestures, pausing gestures (e.g. where a user touches a same location of the screen for at least a threshold period of time) where the user touches or points to one or more locations of gesture-based I/O device 1106. Gesture-based I/O device 1106 and may also include non-tap gestures. Gesture-based I/O device 1106 may output or display information, such as graphical user inter-face, to a user. The gesture-based I/O device 1106 may present various applications, functions and capabilities of the computing device 1002 including, for example, to acquire images, view images, process the images and display new images, messaging applications, telephone communications, contact and calendar applications, Web browsing applications, game applications, e-book applications and financial, payment and other applications or functions among others.

Although the present disclosure illustrates and discusses a gesture-based I/O device 1106 primarily in the form of a display screen device with I/O capabilities (e.g. touchscreen), other examples of gesture-based I/O devices may be utilized which may detect movement and which may not comprise a screen per se. In such a case, computing device 1002 includes a display screen or is coupled to a display apparatus to present new images and GUIs. Computing device 1002 may receive gesture-based input from a track pad/touch pad, one or more cameras, or another presence or gesture sensitive input device, where presence means presence aspects of a user including for example motion of all or part of the user.

One or more communication units 1108 may communicate with external devices (e.g. server 1008, server 1010, second computing device 1014) such as for the purposes as described and/or for other purposes (e.g. printing) such as via communications network 1006 by transmitting and/or receiving network signals on the one or more networks. The communication units may include various antennae and/or network interface cards, chips (e.g. Global Positioning Satellite (GPS)), etc. for wireless and/or wired communications.

Input devices 1104 and output devices 1110 may include any of one or more buttons, switches, pointing devices, cameras, a keyboard, a microphone, one or more sensors (e.g. biometric, etc.), a speaker, a bell, one or more lights, a haptic (vibrating) device, etc. One or more of same may be coupled via a universal serial bus (USB) or other communication channel (1138). A camera (an input device 1104)

may be front-oriented (i.e. on a same side as) to permit a user to capture image(s) using the camera while looking at the gesture based I/O device 1106 to take a "selfie".

The one or more storage devices 1112 may take different forms and/or configurations, for example, as short-term memory or long-term memory. Storage devices 1112 may be configured for short-term storage of information as volatile memory, which does not retain stored contents when power is removed. Volatile memory examples include random access memory (RAM), dynamic random access memory (DRAM), static random access memory (SRAM), etc. Storage devices 1112, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Though not shown, a computing device may be configured as a training environment to train neural network model 1114 for example along with appropriate training and/or testing data.

The deep neural network may be adapted to a light architecture for a computing device that is a mobile device (e.g. a smartphone or tablet) having fewer processing resources than a "larger" device such as a laptop, desktop, workstation, server or other comparable generation computing device.

It is understood that second computing device 1014 may be similarly configured as computing device 1002. Second computing device 1014 may have GUIs such as to request and display image(s) and skin sign diagnoses from data stored at server 1008 for different users, etc.

Figure 12:
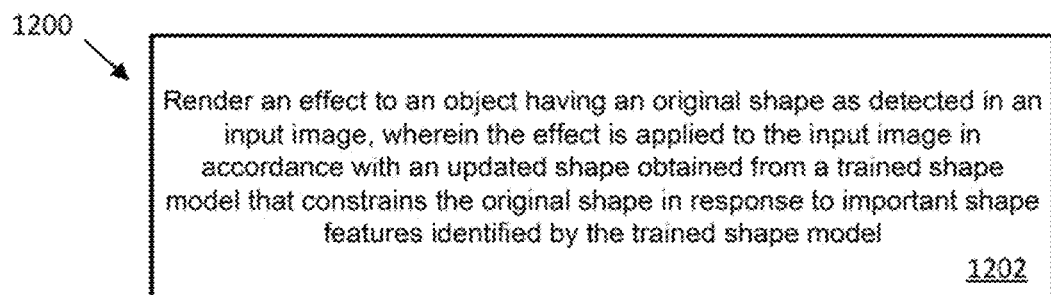
FIG. 12 is a flowchart of operations of a computing device in accordance with an embodiment.

FIG. 12 is a flowchart of operations 1200 such as for performing a method. The method, in an embodiment, is a computer-implemented method executed by a processor to perform one or more steps. At 1202, operations render an effect to an object having an original shape as detected in an input image (e.g. by a deep neural network for object localization), wherein the effect is applied to the input image in accordance with an updated shape obtained from a trained shape model that constrains the original shape in response to important shape features identified by the trained shape model. Embodiment 1: In this embodiment, the method comprises step 1202, for example. Additional embodiments are apparent including the following numbered embodiments.

Embodiment 2: In accordance with Embodiment 1, the rendering is a component of a method to provide an augmented reality experience, such as a VTO experience, in which the effect simulates the application of a product to the object.

Embodiment 3: In Embodiment 1 or 2, the object is a nail of a hand or a foot and the effect is a nail effect simulating a nail product.

Embodiment 4: In Embodiment 3, the object is a first object of a plurality of objects including a second object comprising another nail of a hand or a foot and wherein the method comprises localizing each of the first object and the second object and tracking respective locations of the first object and the second object between frames of a video. The rendering further comprises rendering a first effect to the first object and rendering a second effect, different from the first effect, to the second effect, the first effect applied in accordance with a first updated shape obtained from the trained shape model for the first object and the second effect applied in accordance with a second updated shape obtained from the trained shape model for the second object. For example. Embodiment 4 provides nails having different colors, nail art or other effects. Localizing and tracking different nails is described at least with reference to class maps and augmented maps and five nails of a single hand.

Embodiment 5: In any of Embodiments 1 to 4, the one or more steps further comprise: obtaining a contour of the object; using the trained shape model to determine the important features of the original shape responsive to the contour; constraining the contour in response to the important features; and generating a rendering mask using the contour as constrained, the rendering mask for use when rendering the effect to the object. Embodiment 6: In Embodiment 5, the one or more steps can further comprise: standardizing and normalizing the contour prior to applying the contour to the trained shape model, and, in relation to the contour as constrained by the trained shape model, undoing the normalizing prior to generating the rendering mask.

Embodiment 7: In any of Embodiments 1 to 6, one or both of the following is true: the trained shape model reduces data dimensionality to identify the important features responsive to the contour of the original shape and the trained shape model is defined and trained in accordance with principal component analysis techniques.

Embodiment 8; In any of Embodiments 1 to 7, the input image comprises a plurality of objects of a same class (e.g. five nail objects) and the step of rendering is performed for each of the plurality of objects as detected in the input image (e.g. to render nail effects to each nail object).

Embodiment 9: In any of Embodiments 1 to 8, the input image comprises a current frame of a series of frames of a video and wherein the one or more steps comprises, prior to the rendering, stabilizing the updated shape in response to a velocity of the object in the series of frames in the video, including the current frame.

Embodiment 10: In Embodiment 9, the input image is a current frame of a video stream and the method comprises: detecting a location of the object in a prior frame of the video step; determining the velocity of the object in accordance with the location in the prior frame and a location in the current frame; applying an exponential moving average to the contour as constrained where a weight is determined by the velocity.

Embodiment 11: In any of Embodiments 1 to 10, the trained shape model determines or not a shape detection error for the original shape in accordance with the shape model. In such an embodiment, the step of rendering can be performed in accordance with an absence of the shape detection error for the object in the input image and the effect is unapplied to the object in the presence of the shape detection error.

Computing device embodiments and computing program product embodiments corresponding to any one or more of Embodiments 1-11 will be apparent. There is further provided Embodiment 12: A system comprising: a nail localization engine including computational circuitry to localize one or more nail objects in an input image of a hand or foot via one or more deep neural networks; a nail shaping engine including computational circuitry for reshaping, via a trained shape model, the one or more nail objects as localized by the nail localization engine; and a rendering component including computational circuitry to render an output image simulating a nail product or nail service applied to the one or more nail objects in accordance with the reshaping by the nail shaping engine to provide a virtual try on (VTO) experience. Additional embodiments included the following numbered embodiments.

Embodiment 13: In Embodiment 12, the system comprises a nail VTO component including computational circuitry to one or both of recommend the nail product or nail service for virtual try on, and purchase the nail product or nail service via an e-commerce transaction.

Embodiment 14: In Embodiment 12 or 13, the input image comprises a current frame of a series of frames of a video and the system comprises a stabilizing component including computational circuitry to stabilize the reshaping of the one or more nail objects between the series of frames of the video.

Embodiment 15: In Embodiment 14 in respect of a single hand, the one or more nail objects comprise five objects comprising a pinky nail object, a ring nail object, a middle nail object, a pointer nail object and a thumb nail object and the nail localization engine comprises computational circuitry to localize each of the five objects and track respective locations of the five objects between frames of a video and wherein the rendering component includes computational circuitry to render a first effect simulating a product or service to at least one of the five objects and render a second effect, different from the first effect, to at least a different one of the five objects.

Embodiment 16: In any of Embodiments 12 to 15, one or both of the following is true: the trained shape model reduces data dimensionality to identify the important features; and the trained model is defined and trained in accordance with principal component analysis techniques.

Embodiment 17: In any of Embodiments 12 to 16, the one or more deep neural networks is configured for antialiasing in each of the encoder and decoder components, the encoder components performing antialiasing when downsampling and the decoder components performing antialiasing when upsampling. Computer implemented method embodiments and computing program product embodiments corresponding to any one or more of Embodiments 12-17 will be apparent.

Object Localization—Antialiasing

It is desired that convolutional neural networks (CNNs) should be shift equivariant. This means that shifting an input by a few pixels in a given direction should produce an output equal to the original output shifted in the same direction. However, due to aliasing, CNNs produce different outputs even for shifted versions of the same input. Antialiasing is discussed in Zhang, R. Making Convolutional Networks Shift-Invariant Again, International Conference on Machine Learning (ICML) 2019, (available at the time of filing at arxiv.org/abs/1904.11486), the entire contents of which are incorporated herein by reference.

Figure 13:
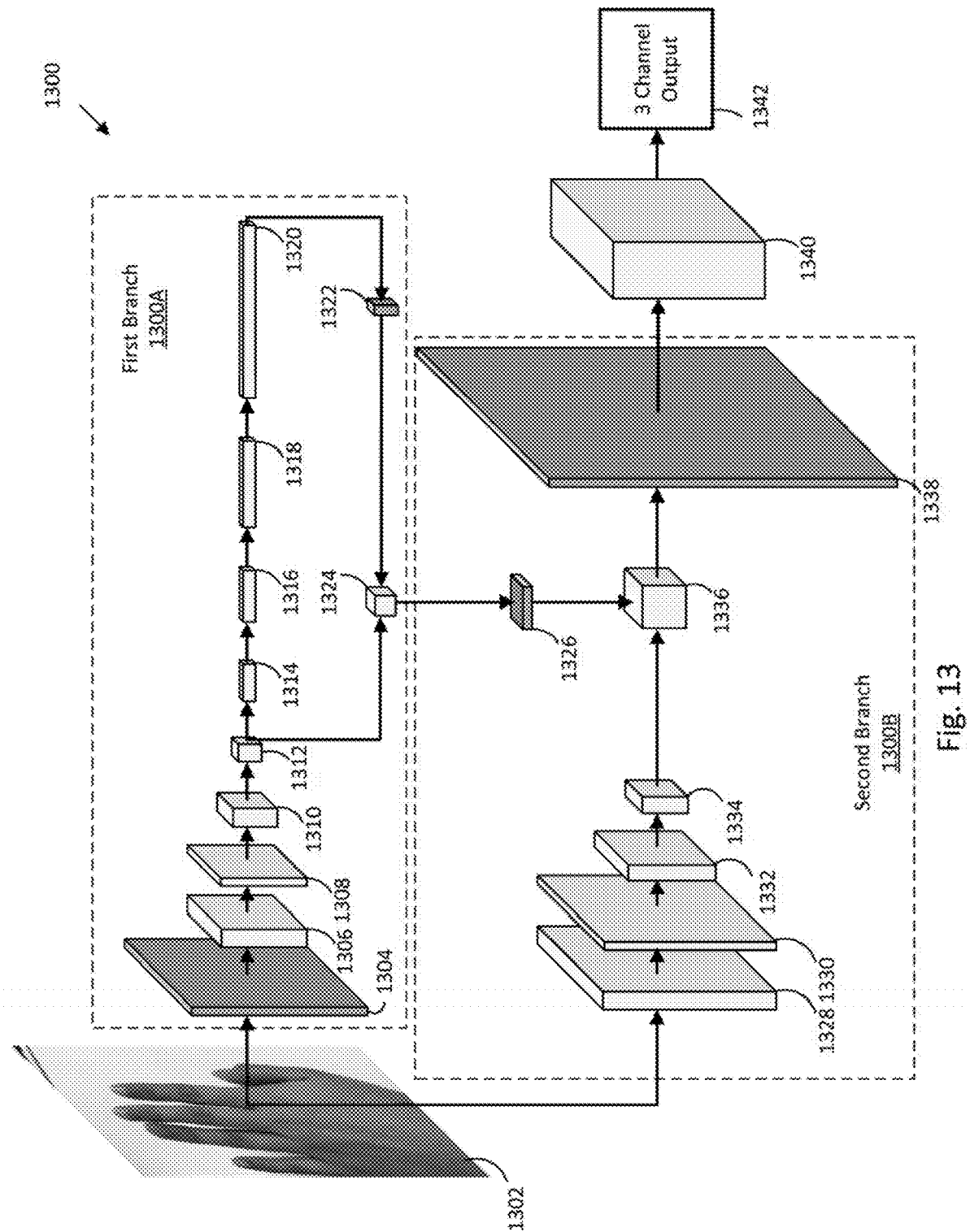
FIG. 13 is a graphic illustration of a CNN processing an image in accordance with an example.

FIG. 13 is a graphic illustration of a CNN 1300 in accordance with an embodiment for processing an image in accordance with an example for improved aliasing. CNN 1300 is adapted for antialiasing using the CNN from US2020/0349711A1. CNN 1300 is an example of a deep neural network for objection location and segmentation, for example, for nail objects with improved antialiasing.

When performing object localization, particularly segmentation of objects, aliasing is introduced by resampling operators in a segmentation CNN, such as the deep neural network described in US2020/0349711A1. Resampling happens at downsampling and upsampling layers when the input is resized to a smaller or larger resolution (down and upsampling, respectively). In the nail CNN of US2020/0349711A1, the downsampling happens in the encoder at convolution layers with a stride of 2 (final conv layers of each "stage" in the unadapted CNN). Upsampling happens in the decoder of the unadapted CNN when lower-resolution feature maps are upsampled and combined with higher-resolution feature maps ("Up" layers in the unadapted CNN). To counter aliasing, antialiasing is introduced in both the stride-2 convolution layers of each stage and the upsampling layers of the up layers such as further described.

Figure 14:
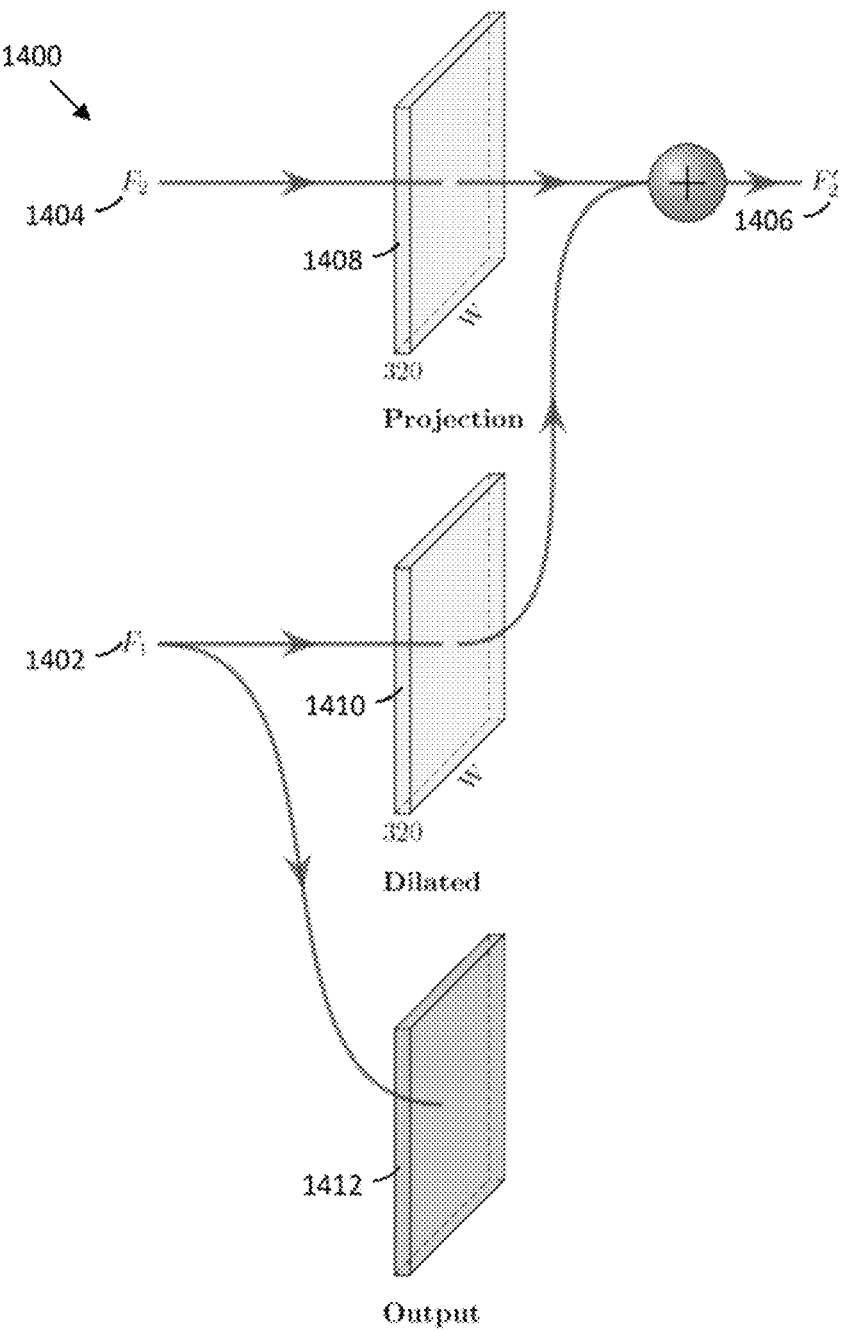
FIG. 14 is a graphic illustrations of a portion of the CNN of FIG. 13.

FIG. 13 shows CNN 1300, as adapted for antialiasing in accordance with an embodiment, and processing an input (image) 1302 using two branches. FIG. 14 is a graphic illustration of a portion of CNN 1300. The first branch 1300A (upper branch in FIG. 13) comprises blocks 1304-1324. The second branch 1300B (lower) in FIG. 13 comprises blocks 1326-1338. It will be appreciated that these bright-line distinctions may be modified. For example, block 1326 may be a block of the first branch 1300A. Block 1304 is an area downsampling×2 block. Though not shown, BlurPool may be used here in place of area downsampling. Blocks 1306-1320 (also referenced as stage_low1, stage_low2, . . . stage-low8) are blocks of the encoder-decoder backbone (having an encoder phase and a decoder phase) as further described. Blocks 1306-1320 are adapted for antialiasing as further described. Block 1322 is an upsampling×2 block and block 1324 is a first branch fusion block as further described. Block 1322 is adapted for antialiasing as further described. Block 1326 is also an upsample X2 block. Block 1326 is adapted for antialiasing as further described. Blocks 1328-1334 (also referenced as stage_high1, stage_high2, . . . stage-high4) are blocks of an encoder phase as further described. Blocks 1328-1334, similar to blocks 1306-1320 are adapted for antialiasing as further described. Block 1338 upsamples×8 and then provides the resulting feature map to decoder model 1340 further described with reference to FIG. 14. Block 1338 is adapted for antialiasing, similar to blocks 1322 and 1326 as further described below.

In an embodiment, the encoder-decoder backbone is modelled upon MobileNetV2 (See, Mark Sandler, Andrew Howard. Menglong Zhu, Andrey Zhmoginov, and Liang-Chieh Chen. Mobilenetv2: Inverted residuals and linear bottlenecks. In The IEEE Conference on Computer Vision and Pattern Recognition (CVPR), June 2018) as further adapted for antialiasing as described herein. In an embodiment, the encoder phase (blocks 1328-1332) of the second branch is also modelled upon the encoder of MobileNetV2) as further adapted for antialiasing as described herein.

In an embodiment, encoder blocks 1306-1320 and 1328-1334 are adapted from similar blocks of the original nail CNN. In blocks 1306-1320 and 1328-1334, all original nail CNN operators of type: [Conv(stride=2)→BatchNorm→ReLU] [Conv(stride=1)→BatchNorm→ReLU→BlurPool(stride=2)] in CNN 1300.

BlurPool is implemented as described in Zhang, R. Making Convolutional Networks Shift-Invariant Again, ICML 2019. An input feature map of shape H×W×C is first convolved with a low-pass filter. The size and type of the filter is a hyperparameter of the method therein. Then the BlurPool'ed feature map is downsampled by the stride. In an embodiment for nails, the stride is 2 for CNN 1300.

In an embodiment, all nearest neighbour or bilinear upsampling operators in the original nail CNN become a custom BlurZoom(stride=2) operator in in CNN 1300. FIG. 15A is a graphic illustration of a BlurZoom operation 1500 performed when upsampling, in accordance with an embodiment. In an embodiment, BlurZoom comprises two steps: a zero-insertion operation 1500 as shown in FIG. 15A followed by convolution with a low-pass filter. FIGS. 15B-15G are examples of tensor data in relation to BlurZoom operations in accordance with embodiments as described further. Zero insertion intersperses to a group (e.g. 4×4) of existing values 1502 a plurality of zero values, to produce an upsampled group (e.g. 8×8) where ¾ of the resulting values are zero values. The upsampled group is then convolved with a filter (e.g. Gaussian or another). In an embodiment, the BlurZoom low-pass filters are the same filters used in BlurPool. If the filter sums to 1, operations multiply by 4. It can be understood that if a filter sums to 1, that implies that the filter preserves the mean intensity of the output. Normally most filters, including low pass filters, will sum to one. In BlurZoom, since zeros are inserted (or notionally inserted as described below), the resulting mean intensity is decreased. For example, when 3 zeroes are inserted around each value, the mean intensity is reduced to ¼. Multiplying by 4 counteracts that reduction to keep the mean intensity preserving property of the filter.

In both of BlurPool and BlurZoom operators, the low pass filters provides a form anti-aliasing to achieve shift equivariance. Normally, strided convolution is not shift equivariant as the output values can dramatically change when the input is slightly shifted due to the discrete subsampling that occurs. BlurPool seeks to solve this issue by applying a low pass filter before subsampling. Intuitively, the low pass filter can be thought of as "diffusing" each value into the neighboring regions (of values), so subsampling becomes less sensitive to shifts as the values have become "diffused".

In accordance with teachings and techniques herein, in the case of BlurZoom, the low pass filter "diffuses" values into the newly inserted (actually or notionally) rows and columns, so that any subsequent operations receive shift-equivariant input.

As described with reference to FIG. 15A, in an embodiment without any optimizations, the BlurZoom operation is implemented by first inserting zeros around each value and then applying convolution to each value for low pass filtering. For example, in the case of a 3×3 convolution, the calculation involves 9 multiplications and 8 additions per value. To optimize this, in an embodiment. BlurZoom operations can ignore the zeros in the calculation.

FIGS. 15B, 15C, 15D, 15E and 15F are examples of tensor data (values) 1506, 1508, 1510, 1512 in relation to BlurZoom operations in accordance with embodiments to illustrate optimization. The letters A-D in Figs. B-E represent existing values before zero insertion. In the case of a 3×3 convolution with stride 2 zero insertion, a central value (e.g. A at the centre of the 3×3 window) will either be surrounded by zeros (1506), the central value will be zero and be surrounded by existing values (e.g. non-zeros) on the corners (1506), or the existing values are otherwise dispersed as shown at 1510 and 1512.

In the first case (1506), if BlurZoom operations ignore the zeros, the BlurZoom operations only need to do one multiplication and no additions. In the second case, BlurZoom operations only need to do 4 multiplications and 3 additions. The last two cases require 2 multiplications and one addition. This averages out to about 2.25 multiplications and 1.25 additions per output value. In an embodiment, this can be further optimized by skipping the zero insertion step. In the above example, BlurZoom operations could create a new tensor that is double in width and height, and calculate each value in the tensor using the approach above, determining which scenario of FIGS. 15B-15E applies based on whether the row and column numbers are odd or even.

Something to note is that the boundaries of the tensor would be a special case. When the convolution requires a value outside of the tensor, it would "reflect" the values near the edge. For example, as shown at 1514 of FIG. 15F, if there are values in all positions, with an "A" at the top-left corner of the tensor, then a 3×3 convolution at "A" would see the result at 1516 of FIG. 15G. Note that in an actual scenario, most of these values are zero.

Thus in an embodiment, the 3×3 convolution is optimized to reduce multiplication or additional operations responsive to zero values. It is noted that the zero values need not actually be present (i.e. inserted). The zeros are notionally present when operations take account of the zero expansion without inserting the values.

Table 1 shows a detailed layer-by-layer description. Table 1 shows a detailed summary of the fingernail segmentation model architecture. Each layer name corresponds to the blocks in FIGS. 13 and 14 as described herein. Height H and width W refer to the full resolution H×W input size. For projection 1408 and dilated layers 1410, $p \in \{16, 8\}$. For stages stage3_low to stage7_low, the number of channels in parentheses is for the first layer of the stage (not shown), which increases to the unparenthesized number for subsequent layers in the same stage.

TABLE 1

| layer name | output size | iOS | TF · js |
|---|---|---|---|
| stage1_low | $\frac{H}{4} \times \frac{W}{4}$ | 3 × 3, 32, stride 2 | |
| stage2_low | $\frac{H}{4} \times \frac{W}{4}$ | $\begin{bmatrix} 1 \times 1, 32 \\ 3 \times 3, 32 \\ 1 \times 1, 16 \end{bmatrix} \times 1$ | |
| stage3_low | $\frac{H}{8} \times \frac{W}{8}$ | $\begin{bmatrix} 1 \times 1, 144(96) \\ 3 \times 3, 144(96) \\ 1 \times 1, 24 \end{bmatrix} \times 2$ | |
| stage4_low | $\frac{H}{16} \times \frac{W}{16}$ | $\begin{bmatrix} 1 \times 1, 192(144) \\ 3 \times 3, 192(144) \\ 1 \times 1, 32 \end{bmatrix} \times 3$ | |
| stage5_low | $\frac{H}{32} \times \frac{W}{32}$ | $\begin{bmatrix} 1 \times 1, 384(192) \\ 3 \times 3, 384(192) \\ 1 \times 1, 64 \end{bmatrix} \times 4$ | |
| stage6_low | $\frac{H}{32} \times \frac{W}{32}$ | $\begin{bmatrix} 1 \times 1, 576(384) \\ 3 \times 3, 576(384) \\ 1 \times 1, 96 \end{bmatrix} \times 3$ | |
| stage7_low | $\frac{H}{32} \times \frac{W}{32}$ | $\begin{bmatrix} 1 \times 1, 960(576) \\ 3 \times 3, 960(576), \text{dilated} \times 2 \\ 1 \times 1, 160 \end{bmatrix} \times 3$ | N/A |
| stage8_low | $\frac{H}{32} \times \frac{W}{32}$ | $\begin{bmatrix} 1 \times 1, 960 \\ 3 \times 3, 960, \text{dilated} \times 2 \\ 1 \times 1, 320 \end{bmatrix} \times 1$ | N/A |
| stage 1-4_high same as stage 1-4_low with in/out size ×2 | | | |
| projection_p | $\frac{H}{p} \times \frac{W}{p}$ | 1 × 1, 320 | |
| dilated_p | $\frac{H}{p} \times \frac{W}{p}$ | [3 × 3, 320, dilated] × 2 | |

The decoder of CNN 1300 is shown in the middle and bottom right of FIG. 13 (e.g. blocks 1324 and 1336 (comprising fusion blocks) and upsampling blocks 1322 and 1326 adapted for antialiasing) and a detailed view of the decoder fusion model for each of blocks 1324 and 1336 is shown in FIG. 14. For an original input size H×W, the decoder fuses the $$\frac{H}{16} \times \frac{W}{16}$$

features from stage_low4 (from block 1312) with the upsampled features from block 1322 derived from stage_low8, then upsamples (block 1326) and fuses the resulting features via fusion block 1336 with the $$\frac{H}{8} \times \frac{W}{8}$$

features from stage_high4 (block 1334).

FIG. 14 depicts the fusion module 1400 used to fuse upsampled low-resolution, high semantic information features represented by feature map $F_1$ (1402) with high-resolution, low semantic information features represented by feature map $F_2$ (1404) to produce high-resolution fused features represented by feature map $F_2'$ (1406) in the decoder using blocks 1408, 1410, 1412 and adder 1414. In relation to block 1324, feature map $F_1$ (1402) is output from block 1322 and feature map $F_2$ (1404) is output from block 1312. Feature map $F_2'$ (1406) from block 1324 is upsampled at 1326 for providing to block 1336 as feature map $F_1$ (1402) in that block's instance of model 1400. As noted, the upsampling that is performed at blocks 1322 and 1326 is adapted for antialiasing. In block 1336, feature map $F_2$ (1404) is output received from block 1334 and feature map $F_2'$ (1406) is provided as output to block 338. Block 1338 upsamples to input resolution/4 and then provides the resulting feature map to decoder model 1340. Block 1338 is adapted for antialiasing as noted. Decoder model 1340 produces three types of information for the image (e.g. a 3 channel output 1342) as described further below.

As shown in FIG. 14, a 1×1 convolutional classifier 1412 is applied to the upsampled $F^1$ features, which are used to predict down-sampled labels. This "Laplacian pyramid" of outputs (See. Golnaz Ghiasi and Charless C. Fowlkes. Laplacian reconstruction and refinement for semantic segmentation. In ECCV, 2016) optimizes the higher-resolution, smaller receptive field feature maps to focus on refining the predictions from low-resolution, larger receptive field feature maps. Thus, in model 1400, the feature map (not shown) from block 1412 is not used as output per se. Rather, in training, the loss function is applied in a form of pyramid output regularization.

Block 1342 represents one global output from the decoder 1340 that comprises three channels corresponding to outputs of the blocks from the three decoder branches (not shown). A first channel comprises a per pixel classification (e.g. a foreground/background mask or object segmentation masks), a second channel comprises classification of the segmented masks into individual fingertip classes, and a third channel comprises a field of 2D directionality vectors per segmented mask pixel (e.g. (x,y) per pixel).

In an embodiment, decoder 1340 uses multiple output decoder branches (e.g. three) to provide directionality information (e.g. vectors from base to tip in the third channel) needed to render over fingernail tips, and fingernail class predictions (in the second channel) needed to find fingernail instances using connected components. These additional decoders are trained to produce dense predictions penalized only in the annotated fingernail area of the image. Each branch employs a respective loss function according to the example. While, in an embodiment, a normalized exponential function (Softmax) is used in two of the branches another activation function for segmentation/classification may be used. It will be understood that dimensions herein are representative and may be adapted for different tasks. For example, in decoder 1340, two branches relate to 10 classes (one per nail on two hands, for example), and are dimensioned accordingly.

In an embodiment, CNN 1300 provides a deep neural network for a nail localization engine to localize one or more nail objects in an input image of a hand or foot via one or more deep neural networks.

In an embodiment, output of CNN 1300 is provided to a rendering component for example to use one or more of the mask, the class map and the directional information to render effects to the detected objects. For example, nail effects are applied to the detected nails from CNN 1300, for example to provide a virtual try on (VTO) experience.

In an embodiment output of CNN 1300 is provided to a nail shaping engine for reshaping, via a trained shape model, the one or more nail objects as localized by the nail localization engine. The reshaped nail objects are provided to a rendering component to render an output image simulating a nail product or nail service applied to the one or more nail objects in accordance with the reshaping by the nail shaping engine to provide a virtual try on (VTO) experience.

FIG. 16 is a flowchart of operations 1600 such as for a method in accordance with an embodiment. The method can comprise executing by one or more processors the steps shown in FIG. 16. In an Embodiment 18, a method comprises: (at 1602) localizing one or more nail objects in an input image of a hand or foot via one or more deep neural networks (e.g. of a tracker engine), wherein the one or more deep neural networks is configured for antialiasing in each of the encoder and decoder components; and (at 1604) a rendering component including computational circuitry to render an output image simulating a nail product or nail service applied to the one or more nail objects, responsive to the localizing by the nail localization engine, to provide a virtual try on (VTO) experience. These and other embodiments will be apparent including the following numbered embodiments.

Embodiment 19: In Embodiment 18, the method comprises one or both of recommending the nail product or nail service for virtual try on, and facilitating a purchase of the nail product or nail service via an e-commerce transaction.

Embodiment 20: In Embodiment 18 or 19, the one or more deep neural networks is configured for antialiasing in each encoder stage having a downsampling operation and each decoder block having an upsampling operation.

Embodiment 21: In Embodiment 20, each decoder block having an upsampling operation is configured with an operator of the type: BlurZoom(stride=2), where the BlurZoom operator comprises an actual or notional zero insertion operation to intersperse rows and columns about existing values and a low-pass filter operation to diffuse the existing values into the newly inserted rows and columns to provide any subsequent operations with shift-equivariant input.

Embodiment 22: In Embodiment 21, the low pass filter operation is optimized to reduce multiplications and additions responsive to zero values actually or notionally inserted.

Embodiment 23: In any of Embodiments 20 to 22, each encoder stage having a downsampling operation is configured with operators of the type: Conv(stride=1)→BatchNorm→ReLU→BlurPool(stride=2), where BlurPool operator comprises applying a low-pass filter to diffuse each value into neighbouring regions of values.

Embodiment 24: In any of Embodiments 18 to 23, the method comprises reshaping, via a trained shape model (e.g. of a nail shaping engine), the one or more nail objects as localized by the nail localization engine; and wherein the rendering component renders the output image in accordance with the reshaping of the one or more nail objects by the nail shaping engine.

Embodiment 25: In Embodiment 24: the input image comprises a current frame of a series of frames of a video and the method comprises stabilizing the reshaping of the one or more nail objects between the series of frames of the video.

Embodiment 26: In Embodiment 24 or Embodiment 25: one or both of: the trained shape model reduces data dimensionality to identify the important features; and the trained model is defined and trained in accordance with principal component analysis techniques. Computer implemented method embodiments and computing program product embodiments corresponding to any one or more of Embodiments 18 to 26 will be apparent. Further any of the antialiasing Embodiments 18 to 26 can be combined with any of the object shaping (contouring) and/or stabilizing embodiments 1 to 17 (for example, combining corresponding system, method or computer program product embodiments. Thus the antialiasing techniques can be used in localization operations in combination with the object contouring and/or stabilizing techniques.

In addition to computing device and method aspects, a person of ordinary skill will understand that computer program product aspects are disclosed, where instructions are stored in a non-transient storage device (e.g. a memory, CD-ROM, DVD-ROM, disc, etc.) and that, when executed, the instructions cause a computing device to perform any of the method aspects stored herein.

While the computing devices are describe with reference to processors and instructions that, when executed, cause the computing devices to perform operations, it is understood that other types of circuitry than programmable processors can be configured. Hardware components comprising specifically designed circuits can be employed such as but not limited to an application specific integrated circuit (ASIC) or other hardware designed to perform specific functions, which may be more efficient in comparison to a general purpose central processing unit (CPU) programmed using software. Thus, broadly herein an apparatus aspect relates to a system or device having circuitry (sometimes references as computational circuitry) that is configured to perform certain operations described herein, such as, but not limited, to those of a method aspect herein, whether the circuitry is configured via programming or via its hardware design.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What is claimed is:

1. A system comprising:
   a nail localization engine including computational circuitry to localize one or more nail objects in an input image of a hand via one or more deep neural networks;
   a nail shaping engine including computational circuitry for reshaping, via a trained shape model, the one or more nail objects as localized by the nail localization engine; and
   a rendering component including computational circuitry to render an output image simulating a nail product or nail service applied to the one or more nail objects in accordance with the reshaping by the nail shaping engine to provide a virtual try on (VTO) experience;
   wherein in respect of a single hand, the one or more nail objects comprise five objects comprising a pinky nail object, a ring nail object, a middle nail object, a pointer nail object and a thumb nail object and the nail localization engine comprises computational circuitry to localize each of the five objects and track respective locations of the five objects between frames of a video and wherein the rendering component includes computational circuitry to render a first effect simulating a product or service to at least one of the five objects and render a second effect, different from the first effect, to at least a different one of the five objects.

2. The system of claim 1, comprising a nail VTO component including computational circuitry to one or both of recommend the nail product or nail service for virtual try on, or purchase the nail product or nail service via an e-commerce transaction.

3. The system of claim 1, wherein the input image comprises a current frame of a series of frames of a video and the system comprises a stabilizing component including computational circuitry to stabilize the reshaping of the one or more nail objects between the series of frames of the video.

4. The system of claim 1, wherein the trained shape model reduces data dimensionality to identify the important features of a contour of a detected object; and the trained shape model is defined and trained in accordance with principal component analysis techniques.

5. The system of claim 1, wherein the one or more deep neural networks is configured for antialiasing in each of encoder and decoder components of the deep neural networks, the encoder components performing antialiasing when downsampling and the decoder components performing antialiasing when upsampling.

* * * * *

UNITED STATES PATENT AND TRADEMARK OFFICE
CERTIFICATE OF CORRECTION

PATENT NO. : 12,400,380 B2
APPLICATION NO. : 18/086732
DATED : August 26, 2025
INVENTOR(S) : Edmund Phung Page 1 of 1

It is certified that error appears in the above-identified patent and that said Letters Patent is hereby corrected as shown below:

On the Title Page

Item (71), the Applicant's country of residence is incorrect. Item (71) should read:
--(71) Applicant: L'OREAL, Paris (FR)--

Signed and Sealed this
Thirtieth Day of September, 2025

John A. Squires
*Director of the United States Patent and Trademark Office*